United States Patent [19]

Mark

[11] Patent Number: 5,137,943

[45] Date of Patent: Aug. 11, 1992

[54] REMOVAL OF RESIDUAL ACID FROM CHLORINATED POLYMERS

[75] Inventor: Frank E. Mark, Stade, Fed. Rep. of Germany

[73] Assignee: The Dow Chemical Company, Midland, Mich.

[21] Appl. No.: 685,388

[22] Filed: Apr. 15, 1991

[51] Int. Cl.⁵ ............................................. C08F 6/24
[52] U.S. Cl. .................................... 528/482; 523/310; 528/492
[58] Field of Search .................. 523/310; 528/482, 492

[56] References Cited

U.S. PATENT DOCUMENTS

| | | | |
|---|---|---|---|
| 2,514,191 | 6/1946 | Rowland et al. | 528/482 |
| 2,973,346 | 2/1961 | Bauch et al. | 260/85.3 |
| 4,098,990 | 7/1978 | Lutze et al. | 528/482 |
| 4,650,612 | 3/1987 | Dankowski | 502/159 |
| 4,663,420 | 5/1987 | Chang | 528/500 |
| 4,730,035 | 3/1988 | Mark | 528/507 |

FOREIGN PATENT DOCUMENTS

| | | |
|---|---|---|
| 0101943 | 7/1984 | European Pat. Off. |
| 1069189 | 5/1967 | United Kingdom |
| 1116800 | 6/1968 | United Kingdom |
| 1479831 | 1/1975 | United Kingdom |
| 1381300 | 7/1975 | United Kingdom |

OTHER PUBLICATIONS

Chem. Abstracts, vol. 108, 1988, p. 114, Abstract No. 23833m, Anon. (USA). Re. Discl 1987, 274, 48.
Chemical Abstracts, vol. 108, 1988, Abstract 23833m.

Primary Examiner—Paul R. Michl
Assistant Examiner—Andrew E. C. Merriam

[57] ABSTRACT

The concentration of hydrogen chloride in an aqueous suspension of a macromolecular chlorinated hydrocarbon containing said hydrogen chloride is reduced by contacting liquid phase of the suspension with a strong basic ion exchange resin containing exchangeable hydroxy groups or with a weak basic ion exchange resin.

19 Claims, 1 Drawing Sheet

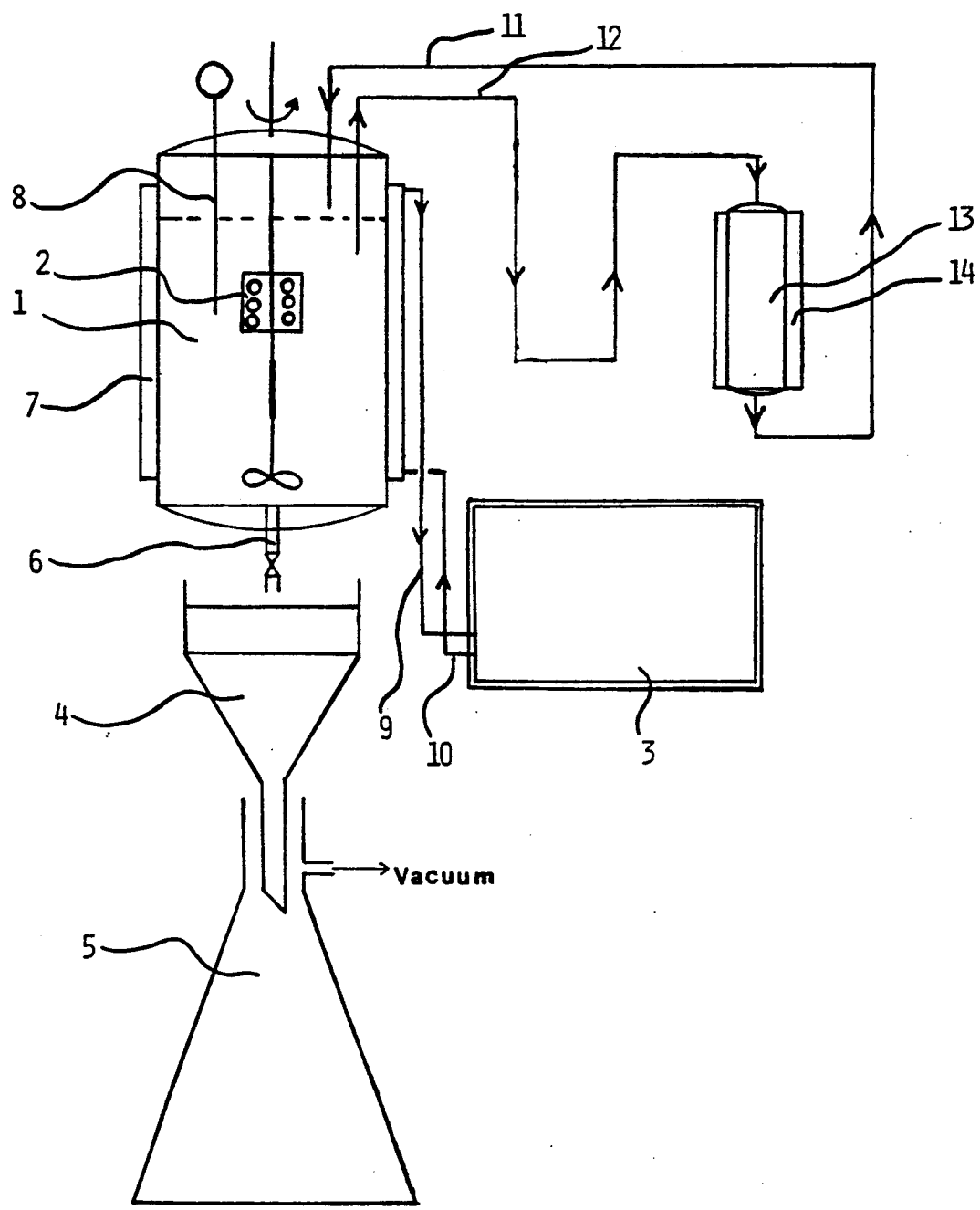

REMOVAL OF RESIDUAL ACID FROM CHLORINATED POLYMERS

BACKGROUND OF THE INVENTION

The present invention relates to a process for reducing the concentration of hydrogen chloride in an aqueous suspension of a macromolecular chlorinated hydrocarbon containing said hydrogen chloride.

Macromolecular hydrocarbons such as polyolefins are generally chlorinated while in the form of finely-divided particles. One process provides for chlorination of the particles while they are suspended in an aqueous medium. Polyolefin resins may also be chlorinated while partially or totally dissolved in a solvent system. These processes generate a considerable amount of hydrogen chloride. The hydrogen chloride is dissolved in the aqueous medium or solvent system and distributed within the particles and on the surface of the particles. The acid must be removed or neutralized if the chlorinated polymer is to be useful for thermoplastic and elastomer applications. Several methods have been suggested for removing residual hydrogen chloride from macromolecular chlorinated hydrocarbons. One method relates to batch-wise centrifugation or filtration of the aqueous suspension the macromolecular chlorinated hydrocarbon and thorough batch-wise washing of the solid particles. However, a very large amount of water is necessary for reducing the amount of hydrogen chloride within and on the surface of the particles to an acceptable level. Since hydrogen chloride is not only present in the aqueous phase of the suspension but also within and on the surface of the macromolecular chlorinated hydrocarbon, reduction of the amount of hydrogen chloride to an acceptable level has proven to be very difficult. The macromolecular chlorinated hydrocarbons, such as chlorinated polyethylene, have relatively strong bonds to hydrogen chloride, due to their chloride content.

British Patent Specification No. 1,069,189 suggests a dialysis process for separating a strong acid of low molecular weight from an aqueous solution or suspension of an acidic polymer having a higher molecular weight, such as a sulfonated vinylaromatic polymer. An anion-exchange membrane is used for carrying out the dialysis process. The separation of the low molecular weight strong acid from the acidic polymer is based on the relative mobility and diffusion rate. The dialysis unit is designed to pass the dialysis feed liquor into one compartment and rinse water into the two adjacent ones so that the membrane is in contact on one side with dialysis liquor and on the other with water. For rapid removal of the strong acid from the feed liquor, the flow ratio of rinse water to dialysis feed should be high, preferably from 10 to 20:1. However, the use of large amounts of rinse water and the subsequent disposal of the rinse water containing the diluted strong acid are undesirable. Furthermore, according to the examples of the British patent specification only between 57 and 85 percent of the initial amount of strong acid in the feed liquor are removed.

According to another method, hydrochloric acid is neutralized by adding caustic soda or some other alkaline material. However, neutralization leads to the formation of chloride salts within and on the surface of the polymer particles. German Offenlegungsschrift DE-A-1 720 788 suggests treatment of an aqueous suspension of a macromolecular chlorinated hydrocarbon with ethylene oxide and/or propylene oxide in the presence of an alkaline material for neutralizing hydrochloric acid. Again, a chloride salt is formed within and on the surface of the polymer particles. The presence of such chloride salts results in poor electrical properties and high water swell of macromolecular chlorinated hydrocarbons.

U.S. Pat. No. 4,730,035 relates to a method of removing hydrogen chloride from moist chlorinated polyolefins by drying and stripping residual hydrogen chloride from the chlorinated polyolefins with a heated inert drying gas such as nitrogen, helium or argon.

It would be desirable if there were available a process for reducing the concentration of hydrogen chloride in an aqueous suspension of a macromolecular chlorinated hydrocarbon containing said hydrogen chloride which did not require neutralization of hydrogen chloride with an alkaline material and which did not require stripping of hydrogen chloride with a heated inert drying gas.

SUMMARY OF THE INVENTION

The present invention relates to a process for reducing the concentration of hydrogen chloride in an aqueous suspension of a macromolecular chlorinated hydrocarbon containing said hydrogen chloride, characterized in that at least a part of the liquid phase of the suspension is contacted with a strong basic ion exchange resin containing exchangeable hydroxy groups or with a weak basic ion exchange resin.

After the liquid phase of the aqueous suspension has contacted the basic ion exchange resin, it can be recycled to the macromolecular chlorinated hydrocarbon whereby a portion of the hydrochloric acid within the macromolecular particles and on the polymer particles is transferred to the liquid phase of the suspension. Liquid phase can be contacted again with the basic ion exchange resin and then recycled to the macromolecular chlorinated hydrocarbon. By the recycling, wasting large amounts of water is avoided.

Removal of acids from aqueous systems by means of an anion exchanger is generally known. British Patent Specification No. 1,381,300 relates to the preparation of an aqueous coating composition containing a paint binder. The paint binder is a polycarboxylic acid. After the production of the polycarboxylic acid, it is contacted with an anion exchanger to remove the incompletely polymerized or unpolymerized unsaturated carboxylic acids or their salts. U.S. Pat. No. 4,663,420 suggests the production of polyetheroxy-substituted polyphosphazenes by reaction of an alkali metal mono or polyetheroxy alkoxide with a polyphosphonitrilic halide in an inert solvent and purification of the crude polyetheroxy-substituted polyphosphazene solution by mixing the solution with a cycloalkane to precipitate the purified polyphosphazene. Further purification is achieved by dissolving the precipitated polymer in water, contacting the aqueous solution with an ion exchange resin to remove halide and metal ions and recovering the polyetheroxy-substituted polyphosphazene from the aqueous solution by distilling off the water. British Patent Specification No. 1,479,831 relates to the fine purification of a polyolefin, such as polyethylene or polypropylene, which has been produced with the use of a catalyst system comprising a certain halogen-containing compound and an organometallic compound in the presence of an organic diluent. The produced polyolefin is separated from the diluent, freed from the catalyst by means of a liquid containing an acid, such as HCl, and subsequently washed repeatedly with water. This results in a product which contains about 80 ppm of HCl and residual hydrocarbons (e.g. gasoline) in addition to water. The product is heated with water and steam; at least a part of the water is continuously recirculated through an ion exchanger, such as a macromolecular basic resin, and returned to the treating vessel.

However, the above-mentioned patents either teach the removal of other compounds, such as an unsaturated carboxylic acid or a salt thereof (U.S. Pat. No. 4,663,420) or they teach the removal of chloride ions from aqueous solutions or suspensions of polymers wherein the chloride ions are only present in the aqueous phase but are not located within or on the surface of the polymer to a substantial degree (British Patent Nos. 1,381,300 and 1,479,831).

It is very surprising that hydrogen chloride which originates from the chlorination of a macromolecular hydrocarbon and which is not only present in the aqueous phase of the resulting aqueous suspension of the macromolecular chlorinated hydrocarbon but also within and on the polymer itself can be efficiently removed by means of a basic ion exchange resin.

SUMMARY OF THE DRAWING

The drawing illustrates an apparatus which is useful for the process of the present invention.

DETAILED DESCRIPTION OF THE INVENTION

The present invention is applicable to a wide variety of macromolecular chlorinated hydrocarbons. It is particularly useful for reducing the concentration of hydrogen chloride which has been produced by chlorination or post-chlorination of polyolefins, for example polyethylene, polypropylene, or polybutene-1 or copolymers of ethylene, propylene and/or butene-1, or of polyvinyl chloride in an aqueous medium.

The resins are beneficially chlorinated polyolefins, desirably chlorinated polyethylenes. The chlorinated polyethylene resins are suitably prepared by chlorination of essentially linear, finely-divided high density polyethylene or olefin copolymers containing at least about 80 mole percent of ethylene in the copolymer molecule. High density polyethylene (HDPE) preferably has a density of from 0.940 to 0.980 g/cm$^3$. HDPE includes the linear polymers made at low pressure using a coordination catalyst such as a "Ziegler-type" catalyst. Methods for preparation of such polymers are well known in the art, for example as taught by Schildknecht, Polymer Processes Vol. X (1956) or in Chem. Eng. News, Dec. 5, 1977. The olefin copolymers contain up to about 20 mole percent of one or more ethylenically unsaturated monomers copolymerizable with ethylene. Illustrative monomers include non-aromatic hydrocarbon olefins having from three to twelve carbon atoms such as propylene, butene-1, 1-octene, 1,7-octadiene and the like; substituted olefins such as acrylic acid, acrylic acid esters and the like; alkenyl aromatic compounds such as styrene and its derivatives; and other known copolymerizable monomers. The chlorinated polyethylene resins may also be prepared by chlorination of the well known linear low density ethylene copolymers. These ethylene copolymers contain minor amounts (generally up to 20 percent, preferably from 5 to 20 percent by weight) of at least one alphaolefin comonomer selected from the group consisting of propylene, 1-butene, 1-isobutene, 4-methyl-1-pentene, 1-pentene, 1-isopentene, 1-hexene, 1-isohexene, 1-heptene, 1-isoheptene, 1-octene, 1-isooctene, 1-nonene, 1-isononene, 1-decene and 1-isodecene. The amount of comonomers used should generally be enough to result in polymer densities in the low range of 0.90 to 0.94 g/cm$^3$. Furthermore, the chlorinated polyethylene resins may be prepared by chlorination of the ethylene terpolymers disclosed in EP-A-010 428, such as ethylene/1-butene/1-octene or ethylene/propylene/1-octene terpolymers. The chlorinated polyethylene resins are suitably prepared by suspension chlorination as disclosed in U.S. Pat. No. 3,454,544, the teaching of which is incorporated herein by reference thereto. The chlorinated resins may also be prepared by other known suspension or slurry processes, particularly aqueous suspension or slurry processes. The chlorinated polyethylene resins preferably have an average diameter of 200 to 400 microns, more preferably of 250 to 350 microns.

Following completion of chlorination, slurries or suspensions of chlorinated polymer resins generally have a polymer solids content of from 5 to 25 weight percent, typically from 10 to 15 weight percent, based upon the weight of the slurry. If the chlorination of the macromolecular hydrocarbon was made in a non-aqueous system, the non-aqueous medium is separated from the chlorinated macromolecular hydrocarbon, for example by centrifugation or filtration. The macromolecular chlorinated hydrocarbon is then redispersed in water. Suitable polymer contents in the aqueous suspension are from 5 to 25 percent, preferably from 10 to 15 percent.

In the practice of the present invention, it is advisable to mechanically separate the macromolecular chlorinated hydrocarbon from the liquid phase of the suspension or slurry; separation can for example be made by filtration, centrifugation or allowing sufficient settling of the macromolecular chlorinated hydrocarbon that the supernatant liquid can be separately treated.

When at least a part of the liquid phase of the aqueous suspension is contacted with the basic ion exchange resin, the content of the macromolecular chlorinated hydrocarbon in the liquid phase preferably is only up to 500 ppm, more preferably only up to 300 ppm (mg macromolecular chlorinated hydrocarbon per kg liquid phase) in order to avoid plugging of the ion exchange system.

Before at least a part, preferably substantially the entire amount of the liquid phase of the aqueous suspension of the macromolecular chlorinated hydrocarbon is contacted the first time with the basic ion exchange resin, the residual acid loading of the aqueous suspension preferably is less than 50,000 ppm, more preferably less than 20,000 ppm and most preferably less than 5,000 ppm, based upon the dry weight of the macromolecular chlorinated hydrocarbon. By "residual acid loading" is meant the residual loading of hydrochloric acid.

The residual acid loading of the aqueous suspension, based upon the dry weight of the macromolecular chlorinated hydrocarbon, is a value calculated according to Formula I.

$$\text{Residual Acid Loading} = \text{PPM-Wet} \div \text{Percent Solids,} \quad \text{(I)}$$

"PPM-WET" is calculated according to Formula II.

PPM-Wet = Weight of Acid in Sample ÷ Total Sample Weight    (II)

wherein total sample weight is the combined weights of acid, macromolecular chlorinated hydrocarbon and water in a sample. "Percent Solids" is determined by weighing a sample before and after drying the sample until no further weight change is observed.

At least part of the liquid phase of the aqueous suspension of the macromolecular chlorinated hydrocarbon is contacted with a basic ion exchange resin, for example by causing the liquid phase to flow once or several times through a container such as a column containing the basic ion exchange resin. The flow through the container may be continuous, the velocity of the liquid phase preferably being from 10 to 80 m/h, more preferably from 20 to 60 m/h. Alternatively, liquid phase of the aqueous suspension may be contacted batch-by-batch with the ion exchange resin. The temperature of the liquid phase when contacting the basic ion exchange resin generally is from 20° C. to 100° C., preferably from 40° C. to 80° C., more preferably from 50° C. to 60° C. The contact time of the liquid phase of the aqueous suspension with the basic ion exchange resin preferably is from 20 to 60 minutes per cycle. Preferably the liquid phase flows from 2 to 7 times, more preferably from 3 to 5 times, through the container comprising the basic ion exchange resin.

Strong basic ion exchange resins containing exchangeable hydroxy groups or weak basic ion exchange resins are useful in the process of the present invention. The terms "strong" and "weak" basic ion exchange resins are known in the art, see for example "Ullmann's Enzyklopaedie der Technischen Chemie", 4th Edition, Vol. 13 page 297.

Typically, the strong basic ion exchange resins contain quaternary ammonium groups which are bound to a polymeric matrix and exchangable anions of which at least a portion are hydroxy groups. Preferably, from 10 to 100 percent, more preferably from 40 to 90 percent and most preferably from 50 to 80 percent of the total number of exchangeable anions are the hydroxy group. The remaining amount may be anions which do not substantially influence the exchange between the hydroxy groups in the anion exchange resins and the chloride groups in the liquid phase of the aqueous suspension and which do not negatively influence the properties of a macromolecular chlorinated hydrocarbon. Such anions are for example chloride, sulfate, carbonate or hydrogen carbonate anions.

Functional groups of strong basic ion exchange resins preferably are:

—N$^+$R$_3$R$_4$R$_5$ X$^-$ groups    (I)

wherein R$_3$ and R$_4$ independently in each occurrence are hydrogen or C$_{1-6}$-elkyl such as n-butyl, tert. butyl, sec. butyl, the pentyl groups, the hexyl groups such as n-hexyl, preferably C$_{1-3}$-alkyl, such as methyl, ethyl, n-propyl or isopropyl;
R$_5$ independently in each occurrence is hydrogen or C$_{1-6}$-alkyl such as n-butyl tert. butyl, sec. butyl, the pentyl groups, the hexyl groups such as n-hexyl, preferably C$_{1-3}$-alkyl, such as methyl, ethyl, n-propyl or isopropyl or is a hydroxy-C$_{1-3}$-alkyl, such as hydroxymethylene or hydroxypropylene or, preferably, hydroxyethylene, or a mono- or di-C$_{1-6}$-alkylaminoethylene- group, preferably a mono- or di-C$_{1-3}$-alkylaminoethylene group such as dimethyl-, diethyl- or dipropylaminoethylene: and
X is the hydroxyl group.

Of the quaternary ammonium groups being bound to the polymeric matrix, trimethylammonium and dimethylhydroxyethylene ammonium groups are preferred of which the trimethyl ammonium group is more preferred due to its high temperature resistance.

Weak basic ion exchange resins containing primary, secondary, or, preferably, tertiary amino groups bound to a polymeric matrix are also useful. Strictly speaking, weak basic ion exchange resins do not exchange chloride ions originating from the aqueous suspension of a macromolecular chlorinated hydrocarbon with other anions but are capable of adsorbing hydrochloric acid due to their basic properties.

Functional groups of weak basic ion exchange resins preferably are:

—NR$_3$R$_3$ groups    (II)

wherein R$_3$ and R$_4$ have the above-mentioned meanings. Preferably, both R$_3$ and R$_4$ are an above-mentioned C$_{1-6}$-alkyl group, most preferably methyl.

Mixed basic ion exchange resins containing functional groups of Formula (I) and (II) are also useful for the process of the present invention. For the purpose of the present invention, the mixed basic ion exchange resins are to be considered as strong basic ion exchange resins if they contain more functional groups of Formula I than functional groups of Formula II. The mixed basic ion exchange resins are to be considered as weak basic ion exchange resins if they contain more functional groups of Formula II than functional groups of Formula I. By no means are the mixed basic ion exchange resins to be construed as being a third class of basic ion exchange resins and being a class different from the strong and weak basic ion exchange resins.

Various cross-linked polymers are useful as a matrix for the resins. One known type of matrix is based on cross-linked phenol/formaldehyde condensation polymers which are for example cross-linked with an aldehyde, a chlorinated hydrocarbon or an epoxy compound. Other known types of matrixes are cross-linked polymers of vinylbenzyl chloride, of acrylic acid of acrylamide or a polyacrylate. The preferred matrixes are cross-linked polystyrene or poly(alphamethylstyrene) or a cross-linked polymer of styrene or alphamethylstyrene which is substituted at the benzene ring with C$_{1-6}$-alkyl, for example methyl, ethyl, tert. butyl, isopropyl, or a halogeno-C$_{1-6}$-alkyl, e.g. chloromethyl, or aminomethyl. The cross-linking agent preferably is an alkyl acrylate or a di- or polyvinyl compound such as trivinyl cyclohexane, ethylene glycol dimethacrylate or trimethylolpropane triacrylate, most preferably divinylbenzene or trivinylbenzene. Divinylbenzene is typically copolymerized with the substituted or unsubstituted styrene or with acrylic acid.

The functional groups can be directly or indirectly bound to the polymeric matrix. For example the functional groups can be bound to the polymeric matrix via alkylene groups such as C$_{1-3}$-alkylene groups, preferably ethylene or methylene with methylene being the most preferred group.

Instead of basic exchange resins having one of the above-mentioned matrixes and functional groups, basic exchange resins of the following type are also useful: cross-linked polyvinylpyridines or polyvinylimidazols, which are for example cross-linked with trimethylolpropane triacrylate or methylenebisacrylamide, such as those commercially available from the Riedel-de Haen Company or cross-linked terpolymers of vinylpyridine, styrene and the cross-linking agent: these resins have to be converted into a salt form before using them as basic ion exchange resins, for example by reacting them with an organic or inorganic acid whereby the nitrogen group is protonated and the resin beads are at least partially provided with exchangeable hydroxy groups. Useful are also quaternized polyvinylpyridine- and polyvinylimidazole-type resins such as poly(methylvinylpryridinium chloride) or cross-linked quaternized poly(dimethylaminoethylmethacrylate) or poly(3-acrylamido-3-methylbutyl trimethylammonium chloride) wherein at least a portion of the chloride anions is replaced by hydroxy groups.

Resin beads having an above-mentioned matrix and above-mentioned functional groups are known and for example described in "Ullmann's Enxyklopädie der Technischen Chemie", 4th Edition, Vol. 13, pages 279 et seq.

The resin beads can have a macroporous or gel-type (microporous) structure. The macroporous resin beads preferably have an average pore diameter of more than 10 nm. The microporous resin beads preferably have an average pore diameter of 0.5 to 5 nm. These resin beads may be prepared according to conventional suspension polymerization techniques such as those taught in U.S. Pat. Nos. 4,564,644; 4,297,220 and 4,382,124. Furthermore, useful resin beads are cross-linked spheroido geltype microporous copolymer beads which have a core/shell morphology. By the term "core/shell morphology" it is meant that the polymeric structure of the copolymer beads changes from the inside to the outside of the bead. The core/shell morphology of the resin beads is detectable using known analytical techniques such as those mentioned in European Patent Application No. 0101943. The core/shell resin beads preferably have a shell containing a lower proportion of cross-linking monomers than the core. Most preferably, the resin beads have a substantially uniform particle size. Their size preferably is from 0.3 mm to 1.2 mm, more preferably from 0.4 mm to 0.8 mm. Resin beads having a uniform particle size can be produced according to European Patent Application No. 0046535 and British Patent Specification No. 1,116,800.

Preferably, the basic ion exchange resins are stable over a relatively long period of time, preferably longer than 3 months, more preferably longer than 6 months, at relatively high temperatures, such as at about 65° C. or more. Useful basic ion exchange resins are for example those prepared from DOWEX TM -SBR ion exchange resins by replacing at least 10 percent, preferably at least 40 percent of the chloride anion by hydroxy groups. The DOWEX TM -SBR ion exchange resins are gel-type (microporous) polystyrene beads cross-linked with divinylbenzene containing about 1.5 meq/ml active trimethylammonium chloride groups. Further basic ion exchange resins are available as DOWEX TM - WGR from The Dow Chemical Company and as AP2-47A from Bayer.

When the basic ion exchange resin is exhausted, it can be regenerated in a known manner by treating it with an alkaline material, for example with aqueous NaOH.

Liquid phase of the aqueous suspension which has contacted the basic ion exchange resin can be recycled to the macromolecular chlorinated hydrocarbon and can be used for washing the macromolecular chlorinated hydrocarbon. The temperature of the liquid phase preferably is from 20° C. to 100° C., more preferably from 40° C. to 100° C., most preferably from 50° C. to 95° C. when it is recycled to the macromolecular chlorinated hydrocarbon. Thereby a portion of the hydrochloric acid which is located within the macromolecular particles and on the macromolecular particles is transferred to the liquid phase of the aqueous suspension. Liquid phase can then be separated from the macromolecular particles, contacted with a basic ion exchange resin to reduce its HCl content and again recycled to the macromolecular chlorinated hydrocarbon. This repeated treatment of liquid phase with a basic ion exchange resin and recycling of liquid phase to the macromolecular chlorinated hydrocarbon can be carried out batch-wise but it is preferably carried out continuously.

Preferably, at least a part of the liquid phase of the aqueous suspension is contacted sufficiently long and sufficiently often with the basic ion exchange resin that the residual acid loading of the liquid phase, after having been contacted with the basic ion exchange resin, is less than 200 ppm, more preferably less than 100 ppm and most preferably less than 50 ppm, based on the total weight of the liquid phase. By "residual acid loading" is meant the residual loading of hydrochloric acid. Preferably, at least a part of the liquid phase of the aqueous suspension is contacted sufficiently long and sufficiently often with the basic ion exchange resin that the residual acid loading of the aqueous suspension, after having been contacted with the basic ion exchange resin, is less than about 1,000 ppm, more preferably less than about 600 ppm, based upon the dry weight of the macromolecular chlorinated hydrocarbon. Usually about 95 percent or more, preferably about 98 percent or more, most preferably about 99 percent or more, of the residual acid loading that was present in the aqueous suspension before it was contacted with the basic ion exchange resin is removed from the aqueous suspension by the process of the present invention.

The macromolecular chlorinated hydrocarbon may then be separated from the liquid phase of the aqueous suspension, for example by filtration and/or centrifugation. The moist macromolecular chlorinated hydrocarbon may be dried in a known manner, for example by means of a heated inert drying gas, such as nitrogen, helium and the like. The drying temperature preferably is from 20° C. to 80° C., more preferably from 25° C. to 65° C.

If the macromolecular chlorinated hydrocarbon exhibits a tendency to agglomerate during drying, the chlorinated hydrocarbon may be mixed with an organic and/or an inorganic particulate additive before drying. The additive preferably is talc, calcium stearate, calcium carbonate or stearic acid coated calcium carbonate. Other known anti-agglomeration additives may also be used provided they do not react with the residual hydrochloric acid or with the macromolecular chlorinated hydrocarbon being dried. Two or more of the additives may be used in combination. The additive is beneficially talc or calcium stearate. The additives are used in an amount sufficient to generally preclude agglomeration of polymer particles during drying thereof. If the additive is talc, the amount is beneficially from 2 to 7 weight percent, based upon the dry weight of the macromolecular chlorinated hydrocarbon. If the additive is calcium stearate, the amount is beneficially form 0.5 to 2 weight percent, based upon the dry weight of the macromolecular chlorinated hydrocarbon. Particulate additives are generally not needed when drying small quantities of macromolecular chlorinated hydrocarbons as is the case with laboratory scale dryers.

A preferred embodiment of the process of the present invention is further illustrated by reference to the figure. Referring now to the figure, an aqueous suspension of a macromolecular chlorinated hydrocarbon containing hydrogen chloride is placed in a tank 1 which is equipped with a stirring means 2, a heating jacket 7 and a temperature control 8. The tank may be equipped with a means for preventing evaporation of water, for example with a known reflux condenser (not shown). The heating jacket is connected with a heat exchanger 3, for example with a water bath, by conducts 9 and 10. The tank 1 is connected with an ion exchange system 13 via conducts 11 and 12. The ion exchange system comprises a means of temperature control, for example a heat exchanger 14. The tank 1 further comprises a value 6 for removing the aqueous suspension from the tank. Preferably, a means for separating the liquid phase of the aqueous suspension from the macromolecular chlorinated hydrocarbon is arranged to the tank. Such a separation means may comprise a filter 4, a container 5 for the liquid phase and a means for drawing a vacuum (not shown).

When the apparatus illustrated by FIG. 1 is in operation, the aqueous suspension of the macromolecular chlorinated hydrocarbon containing hydrogen chloride is stirred, preferably at 50 to 800 revolutions per minute (rpm), more preferably at 100 to 500 rpm. The temperature of the suspension in the tank 1 is maintained at 20° C. to 100° C., preferably at 40° C. to 100° C., more preferably at 50° C. to 95° C., by the heating jacket 7 which is in connection with the water bath 3 having a temperature of from 20° C. to 100° C., preferably from 40° C. to 100° C., most preferably of from 50° C. to 95° C. The liquid phase of the suspension is removed from the tank via an outlet (not shown) which is preferably located at the upper end of the tank. Preferably, the liquid phase is drawn from the tank by a set of two membrane pumps (not shown). The liquid phase is transported through a conduct 11 to the heat exchange system 13 by a known means, for example by a pump (not shown). The ion exchange system preferably comprises a column containing the basic ion exchange resin. The temperature of the liquid phase of the aqueous suspension in the ion exchange resin generally is from 20° C. to 100° C., preferably from 40° C. to 80° C., more preferably from 50° C. to 60° C. The temperature is maintained by the heat exchanger 14. When the temperature of the liquid phase in tank 1 is higher than its desired temperature in the ion exchange system, the liquid phase can be cooled by a known means before it enters the ion exchange system. When the liquid phase has passed the ion exchange system 13, it is recycled to tank 1 via a conduct 12. In general, substantially the entire amount of the liquid phase is circulated within 0.1 to 1 hour, preferably within 0.2 to 0.7 hour. Preferably, the residence time of the liquid phase in tank 1 is less than 1 hour, more preferably less than 0.5 hour and most preferably less than 0.1 hour (the residence time of the liquid phase in the tank corresponds to the volume of the tank divided by the flow rate of the liquid phase). As long as the residual acid loading of the aqueous suspension in tank 1 is more than about 1,000 ppm, based upon the dry weight of the macromolecular chlorinated hydrocarbon, the temperature of the aqueous suspension in tank 1 preferably is from 60° C. to 85° C. and the liquid phase of the aqueous suspension in tank 1 preferably is from 60° C. to 85° C. and the liquid phase of the aqueous suspension is quickly circulated, that means substantially the entire amount of the liquid phase is circulated within 0.1 to 0.3 hour. When the residual acid loading of the aqueous suspension in tank 1 is about 1,000 ppm or less, based upon the dry weight of the macromolecular chlorinated hydrocarbon, it is advisable to increase the temperature of the aqueous suspension in tank 1, preferably to a temperature of from 90° C. to 100° C. The circulation rate of the liquid phase can be reduced. Advantageously, substantially the entire amount of liquid phase is circulated within 0.3 to 0.5 hour. After the concentration of hydrogen chloride in the aqueous suspension has been reduced to the desired level, the macromolecular chlorinated hydrocarbon is separated from the liquid phase of the aqueous suspension by means of a filtration apparatus which for example comprises a filter 4 and a container 5 which can be evacuated.

The present invention is further illustrated by the following examples which should not be construed to limit the scope of the present invention. All parts and percentages are by weight.

EXAMPLE 1

A six-liter jacketed glass vessel was equipped with an air driven stirring device which was equipped with 2 blades of which one was arranged at the lower end and the other one near the upper end of the stirring device. The glass vessel was further equipped with a thermometer and a reflux condenser. The glass vessel contained 2 kg of an aqueous suspension of chlorinated polyethylene containing about 36 weight percent chlorine, based on the total weight of the chlorinated polyethylene. The chlorinated polyethylene had been produced from high density polyethylene having a density of 0.960 g/cm$^3$ and a melt index of 0.1 dg/min. The aqueous suspension contained 12.7 weight percent chlorinated polyethylene. The temperature of the suspension in the glass vessel was 89° C. The suspension was stirred at 150 rpm. All particles of the chlorinated polyethylene had a size of less than 1 mm. The liquid phase of the aqueous suspension was continuously pumped through an ion exchange column containing 400 ml of a macroporous weak basic ion exchange resin which contained a styrene/divinylbenzene matrix and dimethyl amine groups.

The ion exchange resin was commercially available from The Dow Chemical Company as DOWEX TM 66. The flow rate of the liquid phase was 10.6 liters per hour. Prior to contacting the liquid phase with the ion exchange resin, the temperature of the liquid phase was reduced to 70° C. After having passed the ion exchange resin, the liquid was recycled to the glass vessel and reheated to 89° C. The ion exchange resin was regenerated with 1 liter of 4 weight percent aqueous sodium hydroxide and 3 liters of distilled water.

The initial concentration of hydrochloric acid was 1,450 ppm, based on the dry weight of chlorinated polyethylene. After the liquid phase of the aqueous suspension had been pumped through the ion exchange resin for 15 minutes, the concentration of hydrochloric acid in the aqueous suspension was about 750 ppm, based upon the dry weight of chlorinated polyethylene. The liquid effluent of the ion exchange column contained about 100 ppm hydrochloric acid.

EXAMPLE 2

Example 1 was repeated, however the basic ion exchange resin used in Example 2 was a microporous strong basic ion exchange resin which contained a styrene/divinylbenzene matrix and trimethylammonium hydroxy groups. The ion exchange resin was commercially available from The Dow Chemical Company as DOWEX TM SBR-PC. The aqueous suspension contained 12.5 weight percent of the chlorinated polyethylene. The flow of the liquid phase was 16.0 liters per hour. The initial concentration of hydrochloric acid in the aqueous dispersion was 1,630 ppm, based on the dry weight of the chlorinated polyethylene. After having pumped the liquid phase of the aqueous suspension through the ion exchange resin for 15 minutes, the residual hydrochloric acid loading dropped to about 700 ppm, based on the dry weight of the chlorinated polyethylene and remained at about this level.

The effluent of the ion exchange column contained 50 ppm of hydrochloric acid after treatment of the liquid phase for 15 minutes. After an hour of treatment, the effluent of the ion exchange column contained about 5 ppm of hydrochloric acid.

EXAMPLE 3

Example 1 was repeated, however the same ion exchange resin in Example 2 was used which was commercially available from The Dow Chemical Company as DOWEX TM SBR-PC The aqueous suspension contained 11.5 weight percent of the chlorinated polyethylene. The temperature in the jacketed vessel was 88° C. The flow rate of the liquid phase was 21.0 liters per hour. The concentration of the hydrochloric acid in the effluent of the ion exchange column linearly dropped from 175 ppm at the beginning to 75 ppm after 12 minutes. The treatment of the liquid phase with the basic ion exchange resin was continued and the concentration of the hydrochloric acid in the effluent of the ion exchange column could further be decreased, although at a lower speed than at the beginning. After 60 minutes the concentration of the hydrochloric acid in the effluent was less than 5 ppm. The residual hydrochloric acid loading, based on the dry weight of chlorinated polyethylene, was more than 1,900 ppm at the beginning and dropped to 800 ppm within 2 minutes.

EXAMPLE 4

Example 3 was repeated, however the flow rate of the liquid phase through the basic ion exchange resin was only 3.6 liters per hour. The concentration of the hydrochloric acid in the effluent of the ion exchange column linearly dropped from 175 ppm at the beginning to 20 ppm after 90 minutes.

The residual hydrochloric acid loading, based on the dry weight of chlorinated polyethylene, was more than 1,900 ppm at the beginning and dropped to 800 ppm within 2 minutes.

EXAMPLE 5 TO 7

Example 3 was repeated, however the concentration of the chlorinated polyethylene was 12.5 percent, based on the total weight of the aqueous suspension. The temperature in the jacketed vessel was 90° C.

In Example 5 the flow rate of the liquid phase through the basic ion exchange column was 16.0 liters per hour. The concentration of hydrochloric acid in the effluent of the ion exchange column was 84 ppm at the beginning and dropped to less than 20 ppm within 60 minutes and to less than 5 ppm within 120 minutes.

In Example 6 the flow rate of the liquid phase was 20 liters per hour. Essentially the same results were obtained as in Example 5.

In Example 7 the flow rate of the liquid phase was 5.5 liters per hour. The concentration of hydrochloric acid in the effluent of the ion exchange column was 121 ppm at the beginning and decreased to 25 ppm after 2 hours treatment of the liquid phase with the basic ion exchange resin.

EXAMPLE 8 TO 14

Example 1 was repeated, however, a two-liter glass vessel was used and the aqueous suspension of the chlorinated polyethylene was stirred at 400 rpm. An ion exchange column was used which was made of glass, had a diameter of 10 cm and contained the same basic ion exchange resin as in Example 2 which resin was commercially available from The Dow Chemical Company as DOWEX TM SBR-PC. The ion exchange resin was regenerated with 50 weight percent aqueous sodium hydroxide.

The concentration of the chlorinated polyethylene in the aqueous suspension, the temperature of the aqueous suspension and the flow rate of the liquid phase through the ion exchange column are listed in Table 1 below.

TABLE 1

| Example | % Solids[1] | Temperature[2] °C. | Flow Rate[3] l/h |
|---------|-------------|---------------------|------------------|
| 8 | 6.9 | 80 | 12.6 |
| 9 | 7.8 | 70 | 20 |
| 10 | 8.6 | 95 | 20 |
| 11 | 15.6 | 95 | 20 |
| 12 | 11.5 | 95 | 20 |
| 13 | 10.5 | 95 | 20 |
| 14 | 10.5 | 95 | 5 |

[1] Weight percent chlorinated polyethylene, based on the total weight of the aqueous suspension.
[2] Temperature of the stirred aqueous suspension in the glass vessel.
[3] Flow rate of the liquid phase through the ion exchange resin.

The residual hydrochloro acid loading, based on the dry weight of chlorinated polyethylene, and the residual hydrochloric acid loading, based on the liquid phase weight, were measured several times, first prior to the treatment according to the process of the present invention (at "time: 0 min.") and then during the treatment at various points in time. The results are listed in Table 2.

TABLE 2

| Time in Minutes | Example 8 [1]HCl sol | Example 8 [2]HCl liq | Example 9 HCl sol | Example 9 HCl liq | Example 10 HCl sol | Example 10 HCl liq | Example 11 HCl sol | Example 11 HCl liq | Example 12 HCl sol | Example 12 HCl liq | Example 13 HCl sol | Example 13 HCl liq | Example 14 HCl sol | Example 14 HCl liq |
|---|---|---|---|---|---|---|---|---|---|---|---|---|---|---|
| 0 | 18110 | 2450 | 14170 | 7560 | 11560 | 9540 | 59390 | 42790 | 21980 | 6070 | 33710 | 6320 | 7900 | 3720 |
| 10 | | | | | | | | | | | 22910 | 3720 | | |
| 15 | 3930 | 1710 | | | 2760 | 440 | 19160 | 1470 | | | | | | |
| 20 | | | | | | | 16350 | 1240 | 4070 | 1260 | 17890 | 2390 | | |
| 30 | 2510 | 1060 | 1930 | 970 | 1940 | 220 | 9880 | 770 | 2560 | 810 | 5340 | 1590 | 5030 | 2670 |

TABLE 2-continued

| Time in Minutes | Example 8 HCl sol[1] | Example 8 HCl liq[2] | Example 9 HCl sol | Example 9 HCl liq | Example 10 HCl sol | Example 10 HCl liq | Example 11 HCl sol | Example 11 HCl liq | Example 12 HCl sol | Example 12 HCl liq | Example 13 HCl sol | Example 13 HCl liq | Example 14 HCl sol | Example 14 HCl liq |
|---|---|---|---|---|---|---|---|---|---|---|---|---|---|---|
| 45 | 1230 | 560 | | | 1400 | 110 | 6200 | 550 | | | | | | |
| 60 | 1050 | 320 | 1770 | 450 | 1260 | 41 | 4340 | 360 | 540 | 120 | 3180 | 1130 | 4060 | 2120 |
| 75 | | | | | 1090 | 45 | 2730 | 180 | | | | | | |
| 90 | 240 | 100 | 1390 | 360 | 930 | 43 | 2010 | 130 | 350 | 63 | 1230 | 160 | 3240 | 1590 |
| 105 | | | | | 720 | 25 | 1590 | 130 | 270 | 37 | 1370 | 81 | | |
| 120 | 330 | 44 | 1220 | 270 | 330 | 30 | 1380 | 74 | 250 | 27 | 1200 | 73 | 2680 | 1080 |
| 143 | 260 | 23 | | | | | | | | | | | | |
| 150 | | | 980 | 250 | | | | | | | | | | |
| 180 | | | 850 | 160 | | | | | | | | | 1820 | 450 |
| 210 | | | 270 | 100 | | | | | | | | | | |
| 240 | | | 180 | 75 | | | | | | | | | 1130 | 120 |
| 270 | | | 140 | 57 | | | | | | | | | | |
| 300 | | | 60 | 38 | | | | | | | | | 880 | 86 |

[1]HCl sol.: residual hydrochloric acid loading, based on the dry weight of chlorinated polyethylene.
[2]HCl liq.: residual hydrochloric acid loading, based on the liquid phase weight.

What is claimed is:

1. A process for reducing the concentration of hydrogen chloride in an aqueous suspension of a macromolecular chlorinated hydrocarbon containing said hydrogen chloride, wherein at least a part of the liquid phase of the suspension is contacted with a strong basic ion exchange resin containing exchangeable hydroxy groups or with a weak basic ion exchange resin.

2. The process of claim 1, wherein the aqueous suspension contains a chlorinated polyolefin.

3. The process of claim 2, wherein the aqueous suspension contains a chlorinated polyethylene.

4. The process of claim 1, wherein the ion exchange resin contains functional groups of Formula I:

$$-N^+R_3R_4R_5 X^- \text{ groups} \quad (I)$$

wherein $R_3$ and $R_4$ independently in each occurrence are hydrogen or $C_{1-6}$-alkyl;

$R_5$ independently in each occurrence is hydrogen, a $C_{1-6}$-alkyl, a hydroxy-$C_{1-3}$-alkyl or a mono- or di-$C_{1-6}$-alkyl-aminoethylene group; and X is the hydroxy group.

5. The process of claim 1, wherein the ion exchange resin contains functional groups of Formula II:

$$-NR_3R_3 \text{ groups} \quad (II)$$

wherein $R_3$ and $R_4$ independently in each occurrence are hydrogen or $C_{1-6}$-alkyl.

6. The process of claim 1, wherein liquid phase of the suspension is recycled to the macromolecular chlorinated hydrocarbon after having contacted the basic ion exchange resin.

7. The process of claim 3, wherein liquid phase of the suspension is recycled to the chlorinated polyethylene after having contacted the basic ion exchange resin.

8. The process of claim 6, wherein the temperature of the liquid phase which is recycled to the macromolecular chlorinated hydrocarbon is from about 20° C. to about 100° C.

9. The process of claim 6, wherein the temperature of the liquid phase which is recycled to the macromolecular chlorinated hydrocarbon is from about 50° C. to about 95° C.

10. The process of claim 1, wherein liquid phase of the aqueous suspension is contacted with the basic ion exchange resin at a temperature of from about 20° C. to about 100° C.

11. The process of claim 1, wherein liquid phase of the aqueous suspension is contacted with the basic ion exchange resin at a temperature of from about 40° C. to about 80° C.

12. The process of claim 3, wherein liquid phase of the aqueous suspension is contacted with the basic ion exchange resin at a temperature of from about 40° C. to about 80° C.

13. The process of claim 1, wherein the residual acid loading of the aqueous suspension prior to being contacted with the basic ion exchange resin is less than about 50,000 ppm, based upon the dry weight of the macromolecular chlorinated hydrocarbon.

14. The process of claim 3, wherein the residual acid loading of the aqueous suspension prior to being contacted with the basic ion exchange resin is less than about 50,000 ppm, based upon the dry weight of the chlorinated polyethylene.

15. The process of claim 1, wherein the residual acid loading of the liquid phase of the aqueous suspension, after having been contacted with the basic ion exchange resin, is less than about 200 ppm, based upon the total weight of the liquid phase.

16. The process of claim 1, wherein the residual acid loading of the aqueous suspension after having been contacted with the basic ion exchange resin is less than about 1,000 ppm, based upon the dry weight of the macromolecular chlorinated hydrocarbon.

17. The process of claim 3, wherein the residual acid loading of the aqueous suspension after having been contacted with the basic ion exchange resin is less than about 1,000 ppm, based upon the dry weight of the chlorinated polyethylene.

18. The process of claim 1, wherein the amount of the macromolecular chlorinated hydrocarbon in the aqueous suspension is from about 5 to about 25 percent, by the total weight of the aqueous suspension.

19. The process of claim 1, wherein liquid phase of the aqueous suspension is caused to flow once or several times through a container containing the basic ion exchange resin at a velocity of from about 10 to about 80 m/h.

* * * * *